(12) United States Patent
Lin et al.

(10) Patent No.: US 12,589,787 B2
(45) Date of Patent: Mar. 31, 2026

(54) HANDCART

(71) Applicants: Livia Lin, Houston, TX (US); Brian Liu, Houston, TX (US)

(72) Inventors: Livia Lin, Houston, TX (US); Brian Liu, Houston, TX (US)

(73) Assignee: MAGNUM TOOL CORP., INC., Houston, TX (US)

( * ) Notice: Subject to any disclaimer, the term of this patent is extended or adjusted under 35 U.S.C. 154(b) by 438 days.

(21) Appl. No.: 18/105,339

(22) Filed: Feb. 3, 2023

(65) Prior Publication Data

US 2024/0262406 A1 Aug. 8, 2024

(51) Int. Cl.
*B62B 3/02* (2006.01)
*B62B 5/06* (2006.01)

(52) U.S. Cl.
CPC ............... *B62B 3/02* (2013.01); *B62B 5/067* (2013.01)

(58) Field of Classification Search
CPC .. B62B 3/02; B62B 3/04; B62B 3/001; B62B 3/002025; B62B 5/06; B62B 5/0093; B62B 5/061; B62B 5/00; B62B 2207/02; B62B 2207/00; B62B 2203/60; B62B 2205/30; B62B 2205/006; B65D 21/0201
See application file for complete search history.

(56) References Cited

U.S. PATENT DOCUMENTS

| | | | | | |
|---|---|---|---|---|---|
| 3,208,768 | A | * | 9/1965 | Hulbert | B60D 1/00 |
| | | | | | 280/79.11 |
| 5,584,399 | A | * | 12/1996 | King | B62B 3/108 |
| | | | | | 211/41.15 |
| 6,032,966 | A | * | 3/2000 | Young | B62B 3/108 |
| | | | | | 414/11 |
| 6,955,368 | B2 | * | 10/2005 | Bakhoum | B62B 5/0083 |
| | | | | | 280/35 |
| 10,577,150 | B2 | * | 3/2020 | Millhouse | B62B 5/0404 |
| 2003/0006586 | A1 | * | 1/2003 | Comilla | B62B 3/002 |
| | | | | | 280/651 |
| 2008/0265538 | A1 | * | 10/2008 | Hailston | B62B 3/022 |
| | | | | | 280/47.34 |
| 2015/0344052 | A1 | * | 12/2015 | McClanahan | B62B 3/1476 |
| | | | | | 280/659 |
| 2016/0075362 | A1 | * | 3/2016 | Della Polla | B62B 3/02 |
| | | | | | 280/79.11 |
| 2016/0325882 | A1 | * | 11/2016 | Christie | B62B 3/007 |
| 2020/0130719 | A1 | * | 4/2020 | Saeli | B62B 3/02 |

FOREIGN PATENT DOCUMENTS

CN 105966428 A * 9/2016 ............. B62B 3/007

* cited by examiner

*Primary Examiner* — Steve Clemmons

(57) ABSTRACT

One embodiment of the invention provides a cart comprising a frame with casters underneath and sockets located above the casters with longitudinal grooves for receiving and locating uprights formed from square tubing. The frame of the cart provides storage for unused tubing in a way that forms a load-bearing surface for the cart. In one embodiment two carts can be connected side by side by square tubing to accommodate large loads.

16 Claims, 5 Drawing Sheets

HANDCART

FIELD OF THE INVENTION

This invention relates to a cart useful, for example, in a warehouse or in a building or office supply store.

BACKGROUND OF THE INVENTION

In its simplest form, a handcart is simply a platform on casters with a push-handle between a user's waist and shoulder level for moving the cart around after items have been stacked on the platform.

Items that are very large, long or wide are difficult to transport on most carts, and heavy items are difficult to load or unload.

A cart which has the capacity to accommodate large, long, wide and heavy items would be desirable.

SUMMARY OF THE INVENTION

One embodiment of the invention provides a cart having the capabilities for removable uprights formed from square tubing. The cart comprises a frame with casters underneath and sockets located above the casters with longitudinal grooves for receiving and locating the square tubing uprights. The tubing can be positioned after the cart has been loaded and handles protruding from the flat sides of the tubing can be oriented as best suited for guiding the cart.

In another embodiment of the invention, two carts can be connected side by side to accommodate large loads, for example a pallet carrying multiple heavy items.

In a further embodiment of the invention, storage is provided by the frame of the cart for unused tubing in a way that forms a load-bearing surface of the cart.

DETAILED DESCRIPTION OF THE INVENTION

Figure 2:
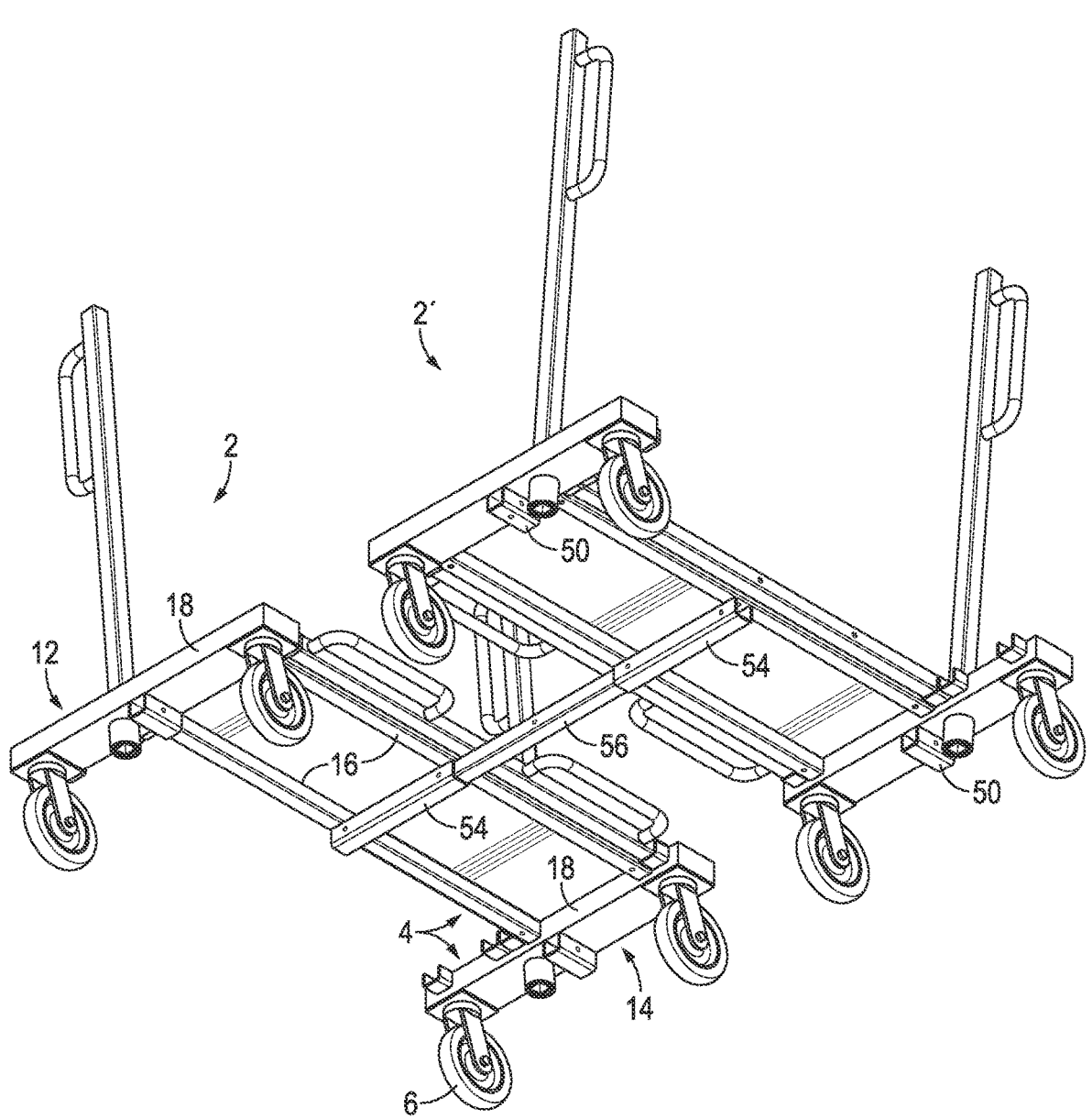
FIG. 2 is a pictorial illustration of another embodiment of the invention from a lower perspective.

In one embodiment of the invention, a cart 2 comprises a frame 4, casters 6 and receptacles 8 for receiving square tubings 10. The frame has a first end 12 and a second end 14. The frame comprises a pair of parallel long members 16 and a pair of parallel short members 18. See FIG. 2. The pair of parallel short members are positioned at the first end and the second end of the frame. The pair of parallel long members connect the pair of parallel short members and extend perpendicularly to the pair of short members. Each of the pair of parallel short members has a first end portion 20 and a second end portion 22. A caster 6 is positioned under each of the first end portion and the second end portion of each of the pair of short members. A receptacle 8 facing upwardly is securely carried by each of the first end portion and the second end portion of the of the pair of short members for securely releasably carrying uprights of square tubing with minimal play. Each receptacle comprises a socket 24 having an upper end 26 and a lower end 28 and defined by a generally cylindrical sidewall 30 extending from the upper end to the lower end and having four grooves 32 at 90-degree spacing extending linearly from the upper end to the lower end of the socket. The grooves are laid out in a square pattern for receiving the edges of the square tubing.

Each socket preferably has a vertical axis, and the cart is preferably provided with four of them. In use, the cart further comprises at least one vertically extending section of a square tubing having rounded corners non-rotationally removably carried by at least one of the sockets, one square tubing per socket, with the rounded corners of the square tubing being received by the four grooves of the socket.

The ratio of the "flat width of the square tube" to the "inside diameter of the round tube (socket)" ranges from 75-90% depending on the radiuses present on the corners of the square tube and as well as the wall thickness of the round tube. The concept pertains as long as the dimensions of the square cutout intersecting the round tube provide adequate surface contact with the inserted square tube to hold it rigidly while not being too hard to insert and remove, and as long as adequate material thickness of the round tube remains. The flat width and radius size is based on the dimensions of the square tubing chosen to be used for the handles, and a closely matched round tubing size will avoid waste in material cost and machining away excess wall material from the round tube.

The square design within the circle allows for less play and a more secure mount.

The vertically extending section of the square tubing has a first end 34 inserted in the socket and a second end 36 spaced apart from the socket. The section of square tubing preferably further comprises a pull handle 38 protruding from a flat side face portion of the square tubing and is preferably straight. The length of the square tubing is preferably slightly less than the spacing between the short members so that it can be stored and out of the way if desired.

Figure 1:
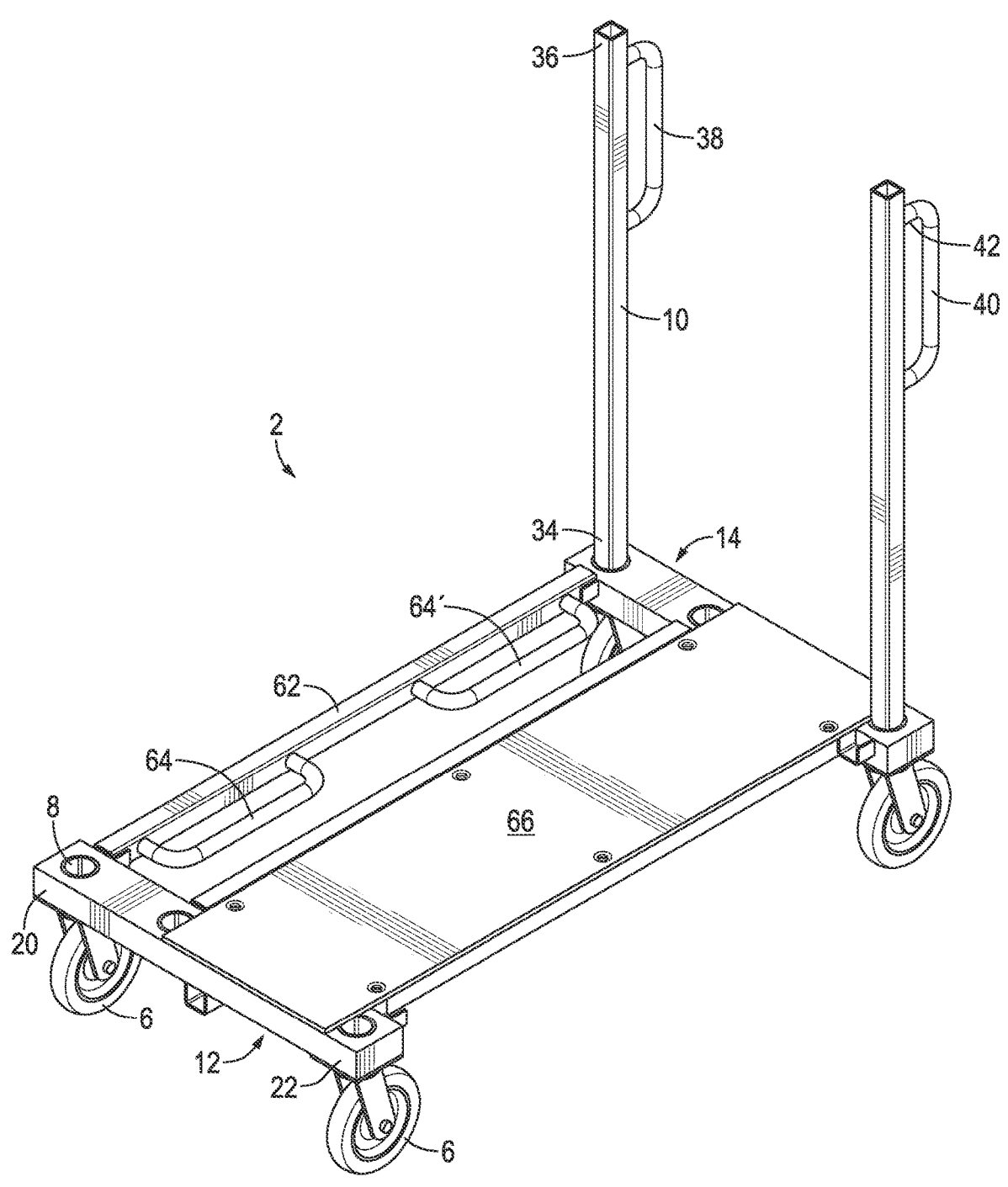
FIG. 1 is a pictorial illustration of one embodiment of the invention from an upper perspective.
Figure 5:
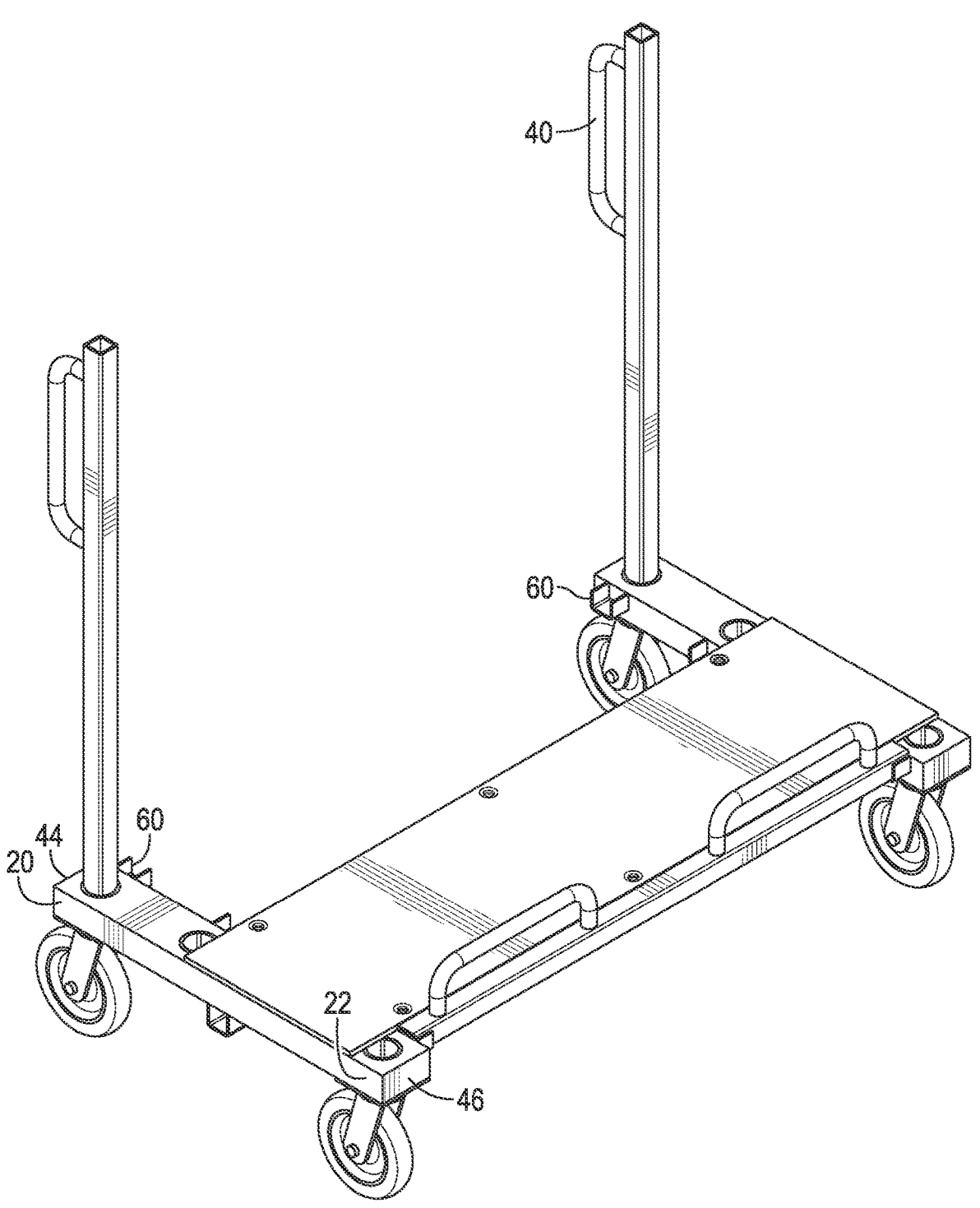
FIG. 5 is a pictorial illustration of another embodiment of the invention.

In a preferred embodiment, the pull handle comprises at least one D-handle having a vertically extending portion 40 connected to the flat side face portion of the square tubing with a spaced apart pair of pedestal portions 42. In one embodiment, when the square tubing is positioned in a vertical socket, the handle protrudes from the square tubing in a direction parallel to the long members. See FIG. 1. In another embodiment, the handle 40 protrudes from the square tubing in a direction parallel to short members. See FIG. 5. Also, in the embodiment shown in FIG. 5, each of the short members has a first end 44 and a second end 46. The first end portion 20 of the short member is adjacent to the first end of the short member and the second end portion of the short member is adjacent to the second end 22 of the short member. A square tubing is carried by a socket in the first end portion of each of the pair of short members, and each square tubing has a handle protruding in a direction away from the second end of the short member.

Figure 3:
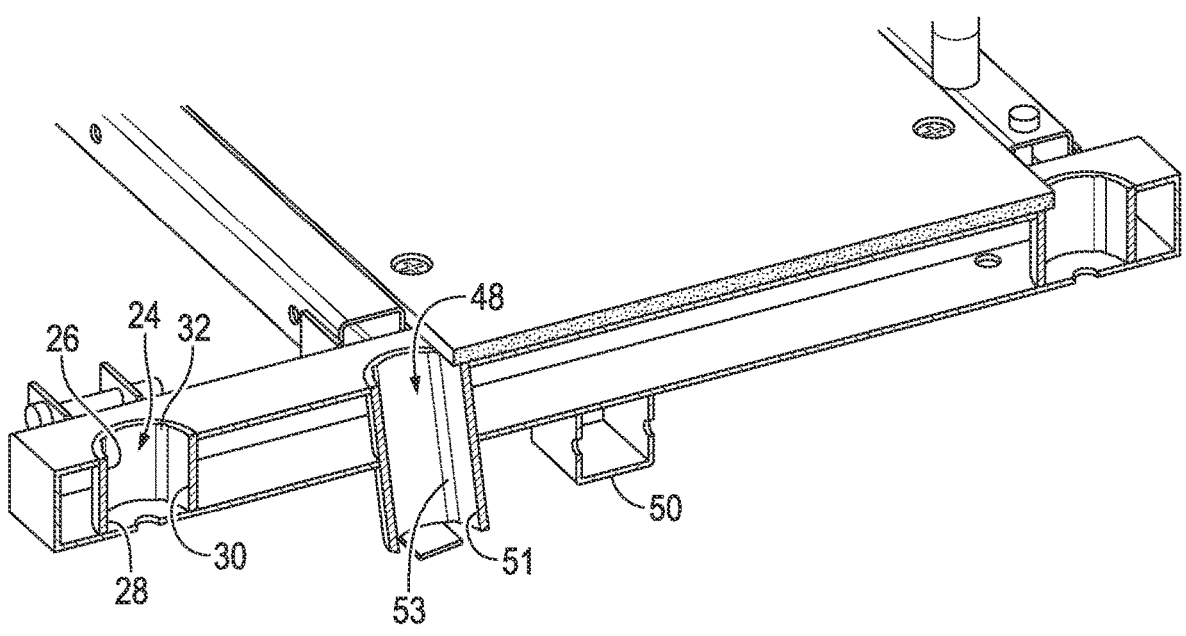
FIG. 3 is a detailed sectional view of a portion of the invention.
Figure 4:
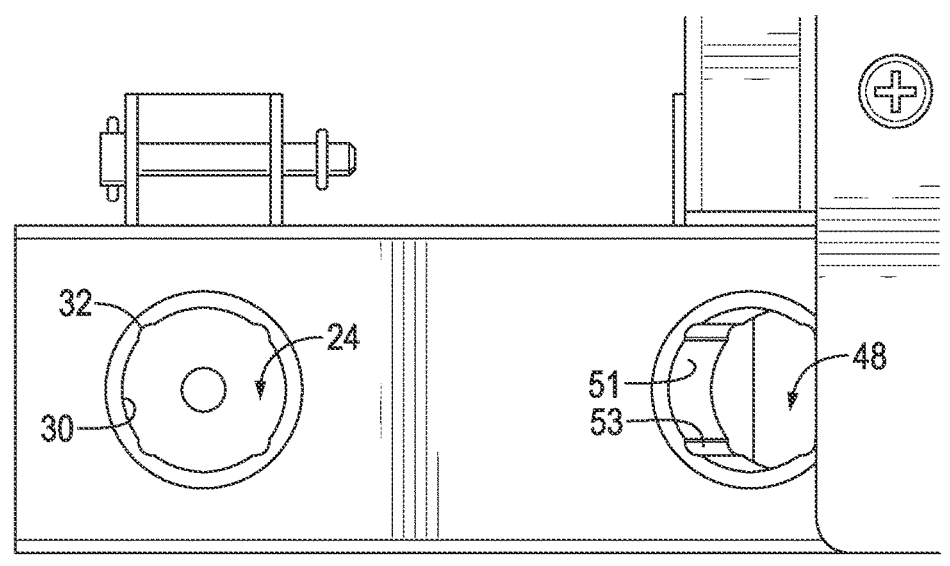
FIG. 4 is a plan view of a portion of the invention shown 45 in FIG. 3.

In a preferred embodiment, a pair of angled sockets 48 is carried by the first end portions of the short members, one angled socket per short member. See FIGS. 3 and 4. Each angled socket has an upper end and a lower end and is defined by a generally cylindrical sidewall extending from the upper end to the lower end. Each angled socket has four grooves at 90-degree spacing extending linearly from the upper end toward the lower end of the socket. Each socket is mounted at an angled axis, so that a section of a square tubing having rounded corners non-rotationally removably carried by one of the angled sockets inclines toward (over) the first end of the short member.

Any desired angle of inclination can be used. For example, the angled axis can incline at an angle in the range of 3 degrees to 30 degrees from the vertical, preferably in the range of 5 degrees to 20 degrees from the vertical. The angled socket is spaced far enough apart from the vertical socket, which is preferably mounted above the caster, so that the caster is free to rotate 360 degrees. For enhanced strength, it is preferred by the short members be of box construction.

Figure 6:
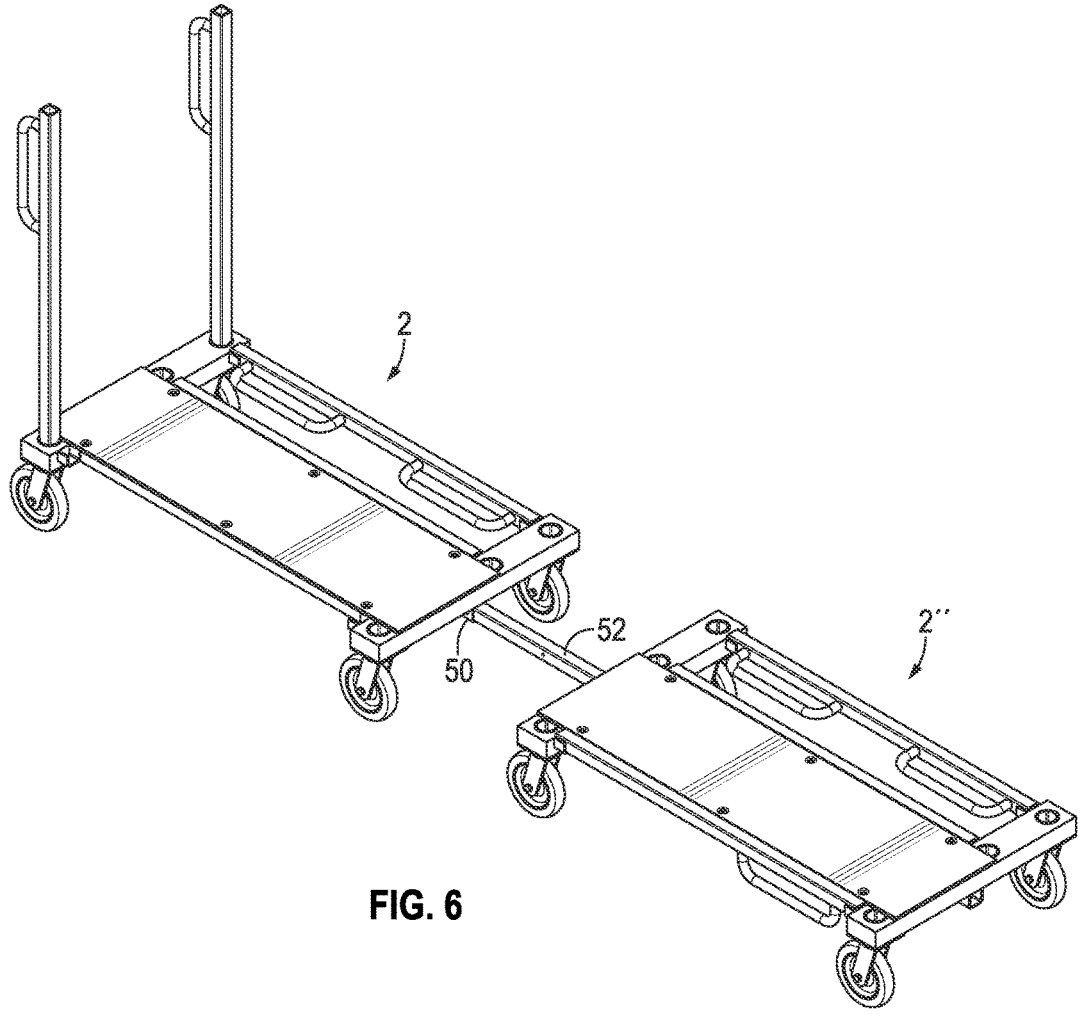
FIG. 6 is a pictorial illustration of another embodiment of the invention. 50

The carts of the invention can be used in combination with other carts. It is preferred that the carts be identical, except for the manner in which they carry square tubings. A longitudinal receiver 50 for a square tube is positioned on a bottom side of each of the short members and oriented to receive and retain a square tube 52 protruding from the short member in a direction parallel to the long members. See FIGS. 2 and 6. The square tube is received by the longitudinally oriented receiver of a second cart 2″ and retained in position by pins or like. See FIG. 6.

Alternatively, another configuration is provided which consists of connecting two or more carts together widthwise. The D handled square tubing can then be inserted into whichever of the available sockets is deemed most suitable for the user's specific application.

One example of such an application for widthwise linked carts would be for a pallet carrying a bundle of tubular goods to be placed atop the linked carts and the D-handled square tubing inserted at opposite ends of the pallet containing said goods so that when the strapping securing the tubular goods is removed, any potential sideward spillage can be contained by the installed D-handled square tubing.

The carts can be joined side by side by providing a transverse receiver 54 for a square tube positioned on a bottom side of the pair of long members and extending at a right angle therebetween. The receiver is oriented to receive and retain a square tube 56 protruding from the pair of long members in a direction at a right angle to the pair of long members. See FIG. 2. The square tube is received by the transverse receiver of a second cart and is retained in position by pins or the like.

Preferably, each of the carts carry a pair of both types of receivers to allow attachment together in both directions, with any of the 4 sides of either cart facing each other.

In creating the additional functionality of attaching the carts side to side, another set of mounts is preferably added to carry any of the handle types or connecting bar so that their top surface is flush with the top surface of the cart, providing even and continuous support for cargo to be loaded above.

Each of the short members preferably carries at least one carrier element 60 for a square tubing protruding toward the other of the short members and shaped to carry a square tubing. See FIG. 5. In a particularly preferred embodiment, each carrier element comprises a channel section defining an upwardly facing slot and each channel section protrudes toward a second channel section carried by a short member at the opposite end of the cart. In use, the cart can further comprise a square tubing 62 positioned in the channel sections carried by the short members. If desired, a pair of spaced apart pull handles 64, 64′ can be provided protruding from a flat side face portion of the square tubing.

In one embodiment of the invention, a plate 66 is mounted to the short members and the long members. It can be constructed of plastic, for example. The plate extends from one short member to the other short member and has a width extending from near the angled sockets on the first end portion of the short members to near the vertical sockets carried by the second end portions of the short members.

If desired, each of the short members can carry a carrier element for a square tubing protruding toward the other of the short members and shaped to carry a square tubing located between an edge of the plate and the second end of each of the short members. See FIG. 5. The mounting brackets can be positioned and spaced so that both D-handles and connecting bars can be stowed flat without protruding up or down.

While certain preferred embodiments have been described herein, the invention is not to be construed as being so limited, except to the extent that such limitations are found in the claims.

What is claimed is:

1. A cart comprising
   a frame having a first end and a second end, said frame comprising
   a pair of parallel long members,
   a pair of parallel short members,
   said pair of parallel short members being positioned at the first end and the second end of the frame,
   said pair of parallel long members connecting the pair of parallel short members and extending perpendicularly to the pair of short members,
   each of the pair of parallel short member having a first end portion and a second end portion,
   said cart further comprising a caster positioned under each of the first end portion and the second end portion of each of the pair of short members,
   said cart further comprising a receptacle facing upwardly securely carried by each of the first end portion and the second end portion of the pair of short members for securely releasably carrying uprights,
   wherein each receptacle comprises a socket having an upper end and a lower end and defined by a generally cylindrical sidewall extending from the upper end to the lower end and having four grooves at 90-degree spacing extending linearly from the upper end to the lower end of the socket, said grooves being laid out in a square pattern for receiving a square tubing.

2. A cart as in claim 1 wherein each socket has a vertical axis, said cart further comprising a vertically extending section of a square tubing having rounded corners non-rotationally removably carried by at least one of said sockets, one square tubing per socket, with the rounded corners of the square tubing being received by the four grooves of the socket.

3. A cart as in claim 2 wherein the vertically extending section of a square tubing having rounded corners has a first end inserted in the socket and a second end spaced apart from the socket, said section of square tubing further comprising a pull handle protruding from a flat side face portion of the square tubing.

4. A cart as in claim 3 wherein the pull handle comprises a D-handle having a vertically extending portion connected to the flat side face portion of the square tubing with a spaced apart pair of pedestal portions.

5. A cart as in claim 2 wherein each of the short members has a first end and a second end, the first end portion of the short member being adjacent to the first end of the short member, and the second end portion of the short member being adjacent to the second end of the short member, and a square tubing is carried by a socket in the first end portion of each of the pair of short members, each square tubing having a handle protruding in a direction away from the second end of the short member.

6. A cart as in claim 2 wherein each of the short members has a first end and a second end, the first end portion of the short member being adjacent to the first end of the short member, and the second end portion of the short member being adjacent to the second end of the short member, said cart further comprising a pair of angled sockets carried by the first end portions of the short members, one angled socket per short member, having an upper end and a lower end and defined by a generally cylindrical sidewall extending from the upper end and the lower end and having four grooves at 90-degree spacing extending linearly from the upper end to the lower end of the socket, wherein each socket has an angled axis, so that a section of a square tubing having rounded corners non-rotationally removably carried by one of said angled sockets inclines toward the first end of the short member.

7. A cart as in claim 6 wherein the angled socket is spaced far enough apart from the vertical socket so that the caster is free to rotate 360 degrees.

8. A cart as in claim 6 further comprising a longitudinal receiver for a square tube positioned on a bottom side of each of the short members and oriented to receive and retain a square tube protruding from the short member in a direction parallel to the long member.

9. A cart as in claim 8 further comprising a square tube having a first end and a second end with the first end received by the longitudinal receiver and the second end received by the longitudinal receiver of a second cart according to claim 8.

10. A cart as in claim 6 further comprising a transverse receiver for a square tube positioned on a bottom side of the pair of long members and extending at a right angle therebetween, said receiver oriented to receive and retain a square tube protruding from the pair of long members in a direction at a right angle to the pair of long members.

11. A cart as in claim 6 wherein each of the short members carries a carrier element for a square tubing protruding toward the other of the short members and shaped to carry a square tubing.

12. A cart as in claim 11 wherein each carrier element comprises a channel section defining an upwardly facing slot and each channel section protrudes toward a second channel section carried by a short member.

13. A cart as in claim 12 further comprising a square tubing positioned in the channel sections carried by the short members.

14. A cart as in claim 13 further comprising a pair of spaced apart pull handles protruding from a flat side face portion of the square tubing.

15. A cart as in claim 6 further comprising a plate mounted to the short members and the long members, said plate extending from one short member to the other short member and having a width extending from near the angled sockets to near the vertical sockets carried by the second end portions of the short members.

16. A cart as in claim 15 wherein each of the short members carries a carrier element for a square tubing protruding toward the other of the short members and shaped to carry a square tubing, said carrier element being located between an edge of the plate and the second end of each of the short members.

* * * * *